US008964663B2

(12) United States Patent
Gaal et al.

(10) Patent No.: US 8,964,663 B2
(45) Date of Patent: Feb. 24, 2015

(54) METHOD AND APPARATUS FOR SIGNALING PAGING CONFIGURATIONS AND CHANNEL STATE INFORMATION REFERENCE SIGNAL (CSI-RS) CONFIGURATIONS

(75) Inventors: Peter Gaal, San Diego, CA (US); Juan Montojo, San Diego, CA (US); Kapil Bhattad, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/338,077

(22) Filed: Dec. 27, 2011

(65) Prior Publication Data

US 2013/0010707 A1 Jan. 10, 2013

Related U.S. Application Data

(60) Provisional application No. 61/430,498, filed on Jan. 6, 2011.

(51) Int. Cl.
*H04J 3/14* (2006.01)
*H04J 1/16* (2006.01)
*H04W 68/00* (2009.01)
*H04L 5/00* (2006.01)
*H04W 72/04* (2009.01)

(52) U.S. Cl.
CPC .......... *H04W 68/00* (2013.01); *H04W 72/0446* (2013.01); *H04W 72/04* (2013.01); *H04L 5/003* (2013.01)
USPC .......................................... 370/329; 370/252

(58) Field of Classification Search
CPC .... H04W 36/22; H04W 36/04; H04W 28/048
USPC .......................................................... 370/329
See application file for complete search history.

(56) References Cited

U.S. PATENT DOCUMENTS

| | | | |
|---|---|---|---|
| 2010/0273506 A1 | 10/2010 | Stern-Berkowitz et al. | |
| 2011/0170496 A1* | 7/2011 | Fong et al. | 370/329 |
| 2011/0199986 A1* | 8/2011 | Fong et al. | 370/329 |
| 2011/0200137 A1 | 8/2011 | Han et al. | |
| 2011/0207459 A1* | 8/2011 | Ramasamy et al. | 455/436 |
| 2011/0235743 A1* | 9/2011 | Lee et al. | 375/295 |
| 2011/0237239 A1* | 9/2011 | Chou et al. | 455/422.1 |
| 2011/0244877 A1 | 10/2011 | Farajidana et al. | |
| 2011/0263254 A1* | 10/2011 | Nader | 455/436 |
| 2012/0088533 A1* | 4/2012 | Khoshnevis et al. | 455/509 |
| 2012/0113844 A1* | 5/2012 | Krishnamurthy | 370/252 |

(Continued)

FOREIGN PATENT DOCUMENTS

JP 2010506446 A 2/2010
WO WO2010145348 A1 12/2010

OTHER PUBLICATIONS

Ericsson, GPP TSG-RAN WG1 #63, Discussion on CSI-RS collision avoidance, Nov. 15, 2010, 3GPP, pp. 1-6.*

(Continued)

*Primary Examiner* — Shripal Khajuria
*Assistant Examiner* — Joe Combs
(74) *Attorney, Agent, or Firm* — Seyfarth Shaw LLP

(57) ABSTRACT

A UE or eNnodeB receives a paging configuration or channel state information reference signal (CSI-RS) configuration of a neighbor cell. The configuration enables calculating when the CSI-RS or muting of the neighbor cell will occur.

14 Claims, 11 Drawing Sheets

(56) References Cited

U.S. PATENT DOCUMENTS

| | | | |
|---|---|---|---|
| 2012/0113846 A1* | 5/2012 | Narasimha et al. | 370/252 |
| 2012/0115469 A1* | 5/2012 | Chen et al. | 455/434 |
| 2012/0115485 A1* | 5/2012 | Narasimha et al. | 455/437 |
| 2012/0120846 A1* | 5/2012 | Hwang et al. | 370/254 |
| 2012/0155291 A1* | 6/2012 | Koivisto et al. | 370/252 |
| 2012/0157082 A1* | 6/2012 | Pedersen et al. | 455/422.1 |
| 2012/0220327 A1* | 8/2012 | Lee et al. | 455/509 |
| 2012/0224555 A1* | 9/2012 | Lee et al. | 370/329 |
| 2012/0264441 A1* | 10/2012 | Chandrasekhar et al. | 455/450 |
| 2012/0315859 A1* | 12/2012 | Lee et al. | 455/67.13 |
| 2012/0329400 A1* | 12/2012 | Seo et al. | 455/63.1 |
| 2013/0044685 A1* | 2/2013 | Fong et al. | 370/328 |
| 2013/0094411 A1* | 4/2013 | Zhang | 370/281 |
| 2013/0208677 A1* | 8/2013 | Lee et al. | 370/329 |
| 2013/0208678 A1* | 8/2013 | Zhang | 370/329 |
| 2013/0223271 A1* | 8/2013 | Huang et al. | 370/252 |
| 2013/0223416 A1* | 8/2013 | Michel | 370/336 |
| 2013/0229940 A1* | 9/2013 | Baker et al. | 370/252 |
| 2013/0229971 A1* | 9/2013 | Siomina et al. | 370/312 |

OTHER PUBLICATIONS

Ericsson et al: "Discussion on CSI-RS collision avoidance", 3GPP Draft; R1-106404 Discussion on CSI-RS Collision Avoidance, 3rd Generation Partnership Project (3GPP), Mobile Competence Centre; 650, Route Des Lucioles; F-06921 Sophia-Antipolis CEDEX; France, vol. RAN WG1, No. Jacksonville, USA; Nov. 15, 2010, Nov. 19, 2010, XP050469906, [retrieved on Nov. 19, 2010].

Huawei et al: "Remaining details on CSI RS", 3GPP Draft; R1-105840, 3rd Generation Partnershi P Project (3GPP), Mobile Competence Centre; 650, Route Des Lucioles; F-06921 Sophia-Antipolis CEDEX; France, vol. RAN WG1, No. Jacksonville, USA; Nov. 15, 2010, Nov. 10, 2010, XP050468169, [retrieved on Nov. 10, 2010].

International Search Report and Written Opinion—PCT/US2011/067621—ISA/EPO—Mar. 16, 2012.

New POSTCOM: "Downlink CSI-RS signaling design for LTE-Advanced", 3GPP Draft; R1-105035, 3rd Generation Partnership Project (3GPP), Mobile Competence Centre, 650, Route Des Lucioles, F-06921 Sophia-Anti Polis CEDEX, France, vol. RAN WG1, No. Madrid, Spain, Aug. 23, 2010, Aug. 27, 2010, XP050450287, [retrieved on Aug. 27, 2010].

QUALCOMM Incorporated: "Applicability of muting to certain messages", 3GPP Draft; R1-106353 Applicabi Lity of Muting, 3rd Generation Partnership Project (3GPP), Mobile Competence Centre; 650, Route Des Lucioles; F-06921 Sophia-Antipolis CEDEX; France, vol. RAN WG1, No. Jacksonville, USA; Nov. 15, 2010, Nov. 9, 2010, XP050467015, [retrieved on Nov. 9, 2010].

QUALCOMM Incorporated: "Remaining aspects of CSI-RS", 3GPP Draft; R1-106351 Remaining Aspects of CSI-RS, 3rd Generation Partnership Project (3GPP), Mobi Le Competence Centre ; 650, Route Des Lucioles ; F-06921 Sophia-Antipolis CEDEX ; France, vol. RAN WG1, No. Jacksonville, USA; Nov. 15, 2010, Nov. 11, 2010, XP050468455, [retrieved on Nov. 11, 2010].

Remaining aspects of CSI-RS in rel-10 operation,3GPP TSG RAN1 #63 R1-106287,Nov. 15, 2010,URL,http://www.3gpp.org/ftp/tsg_ran/WG1_RL1/TSGR1_63/Docs/R1-106287.zip.

Remaining issue for CSI-RS Signaling,3GPP TSG RAN WG1 Meeting #63 R1-106176,Nov. 15, 2010,URL,http://www.3gpp.org/ftp/tsg_ran/WG1_RL1/TSGR1_63/Docs/R1-106176.zip.

ZTE Corporation, "CSI-RS Pattern Design for LTE-Advanced", 3GPP TSG-RAN WG1 Meeting #60 R1-100969, Feb. 18, 2010, pp. 1-7, URL: http://www.3gpp.org/ftp/tsg_ran/wg1_rl1/TSGR1_60/Docs/.

* cited by examiner

METHOD AND APPARATUS FOR SIGNALING PAGING CONFIGURATIONS AND CHANNEL STATE INFORMATION REFERENCE SIGNAL (CSI-RS) CONFIGURATIONS

CROSS-REFERENCE TO RELATED APPLICATION

This application claims the benefit under 35 U.S.C. §119(e) to U.S. Provisional Patent Application No. 61/430,498 entitled "METHOD AND APPARATUS FOR SIGNALING PAGING CONFIGURATIONS AND CHANNEL STATE INFORMATION REFERENCE SIGNAL (CSI-RS) CONFIGURATIONS," filed on Jan. 6, 2011, the disclosure of which is expressly incorporated by reference herein in its entirety.

BACKGROUND

1. Field

Aspects of the present disclosure relate generally to wireless communication systems, and more particularly to methods of signaling paging configurations.

2. Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

According to one aspect of the present disclosure, a method for signaling paging configurations is described. The method includes receiving a paging configuration of a neighbor cell.

In another aspect, a method for signaling channel state information reference signal configurations is described. The method includes receiving a channel state information reference signal (CSI-RS) configuration of a neighbor cell.

In a further aspect, an apparatus for signaling paging configurations is described. The apparatus includes means for receiving a paging configuration of a neighbor cell. The apparatus further includes means for determining channel state information reference signal (CSI-RS) locations and/or muted resource element locations in accordance with the received configuration.

According to another aspect, an apparatus for signaling channel state information reference signal configurations is described. The apparatus includes means for receiving a channel state information reference signal (CSI-RS) configuration of a neighbor cell. The apparatus further includes means for monitoring CSI-RSs in accordance with the received configuration.

In a further aspect, an apparatus for signaling paging configurations is described. The apparatus includes at least one processor; and a memory coupled to the processor. The processor(s) is configured to receive a paging configuration of a neighbor cell. The processor(s) is further configured to determine channel state information reference signal (CSI-RS) locations and/or muted resource element locations in accordance with the received configuration.

In another aspect, an apparatus for signaling channel state information reference signal configurations is described. The apparatus includes at least one processor; and a memory coupled to the processor. The processor(s) is configured to receive a channel state information reference signal (CSI-RS) configuration of a neighbor cell. The processor(s) is further configured to monitor CSI-RSs in accordance with the received configuration.

In a further aspect, a computer program product for signaling paging configurations is described. The computer program product includes a non-transitory computer-readable medium having program code recorded thereon. The computer program product has program code to receive a paging configuration of a neighbor cell. The computer program product further includes program code to determine channel state information reference signal (CSI-RS) locations and/or muted resource element locations in accordance with the received configuration.

According to a further aspect, a computer program product for signaling channel state information reference signal configurations is described. The computer program product includes a non-transitory computer-readable medium having program code recorded thereon. The computer program product has program code to receive a channel state information reference signal (CSI-RS) configuration of a neighbor cell. The computer program product further includes program code to monitor CSI-RSs in accordance with the received configuration.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
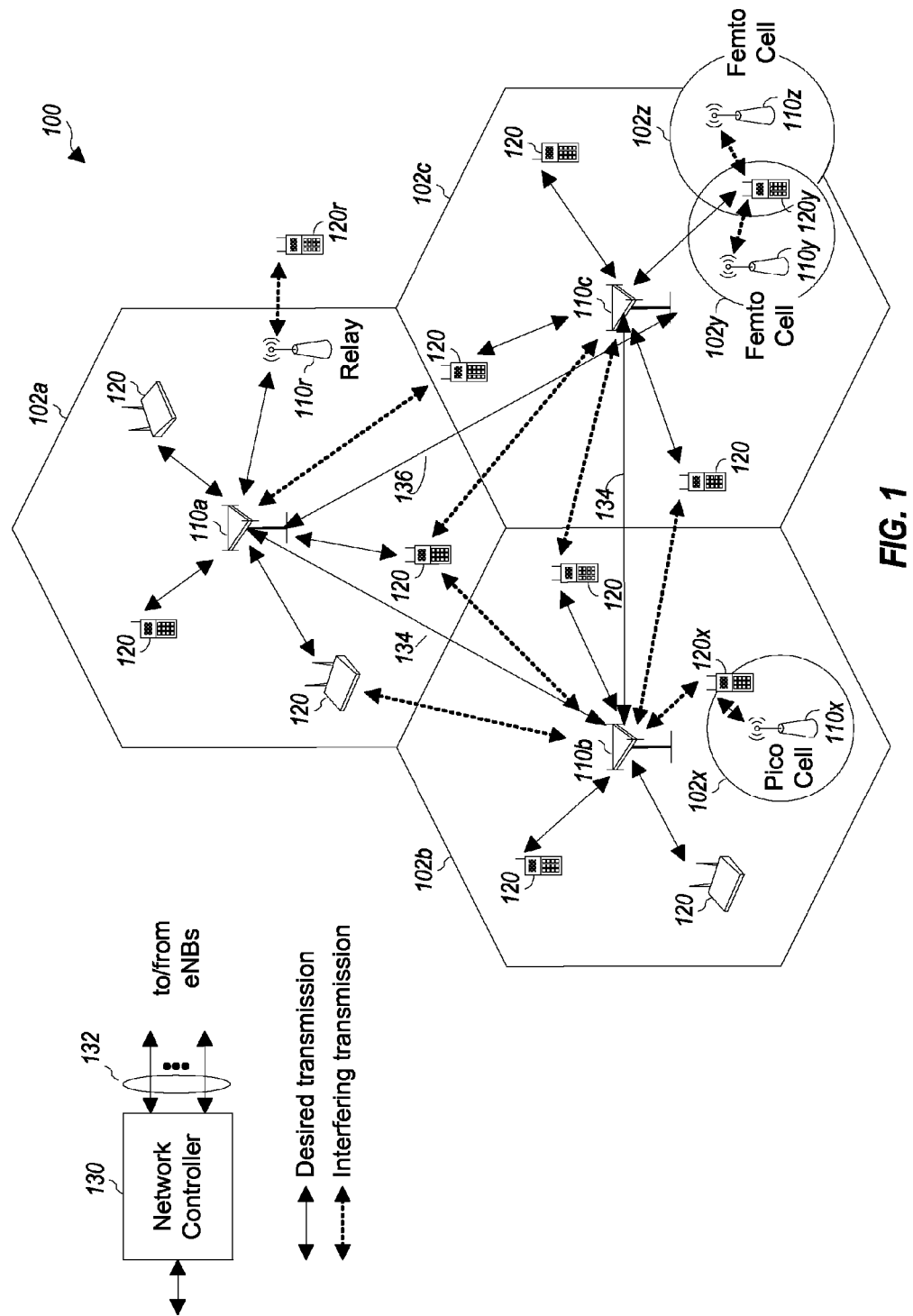
FIG. 1 is a block diagram conceptually illustrating an example of a mobile communication system.

FIG. 1 shows a wireless communication network 100, which may be an LTE-A network, in which paging configurations of cells may be transmitted to a UE. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous operation. For synchronous operation, the eNodeBs may have similar frame timing, and transmissions from different eNodeBs may be approximately aligned in time. The techniques described herein may be used for synchronous operations.

In one aspect, the wireless network 100 may support Frequency Division Duplex (FDD) or Time Division Duplex (TDD) modes of operation. The techniques described herein may be used for FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 (e.g., UE 120x, UE 120y, etc.) are dispersed throughout the wireless network 100, and each UE may be stationary or mobile. A UE may also be referred to as a terminal, a user terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a netbook, a smart book, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
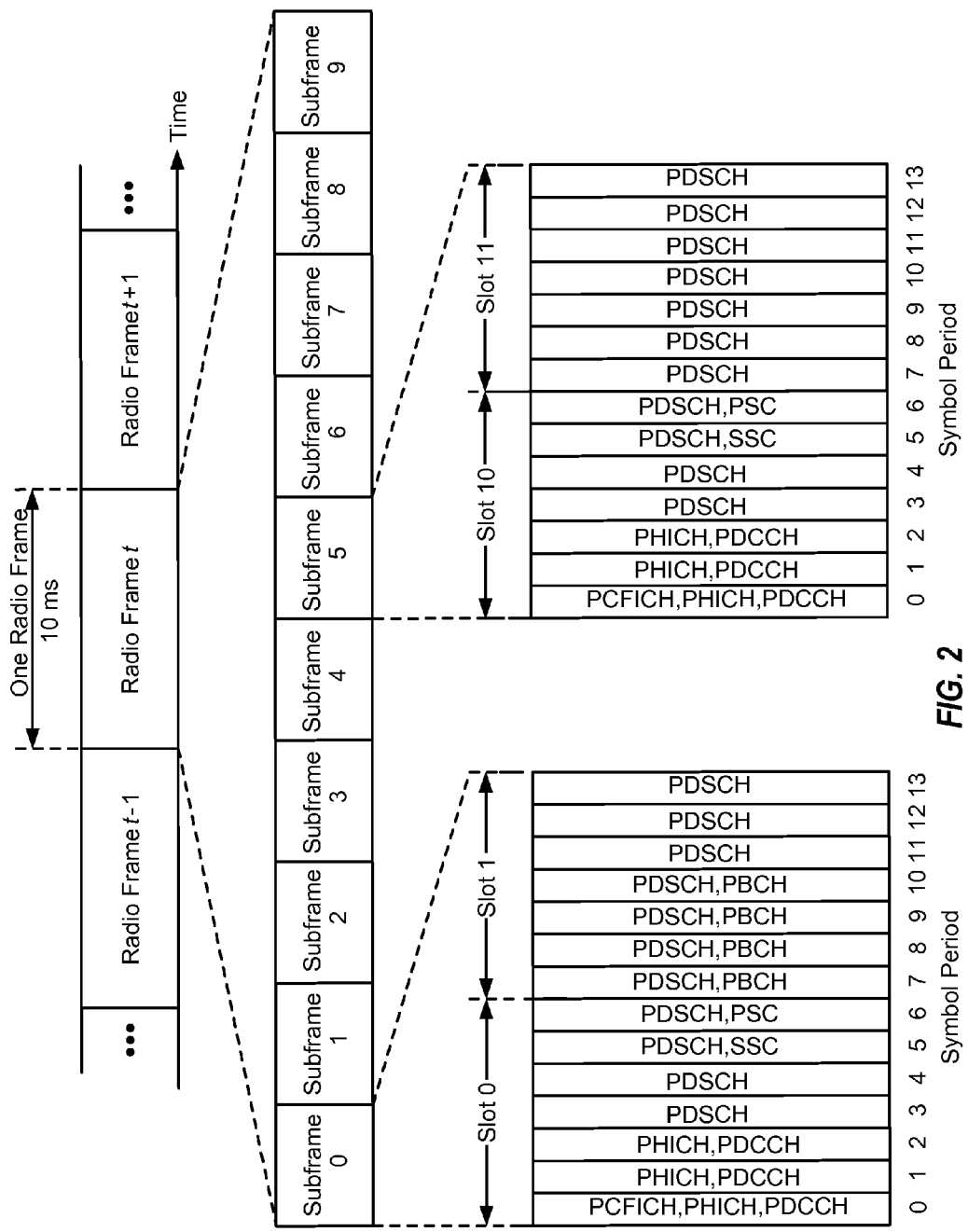
FIG. 2 is a block diagram conceptually illustrating an example of a downlink frame structure in a mobile communication system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic repeat request (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
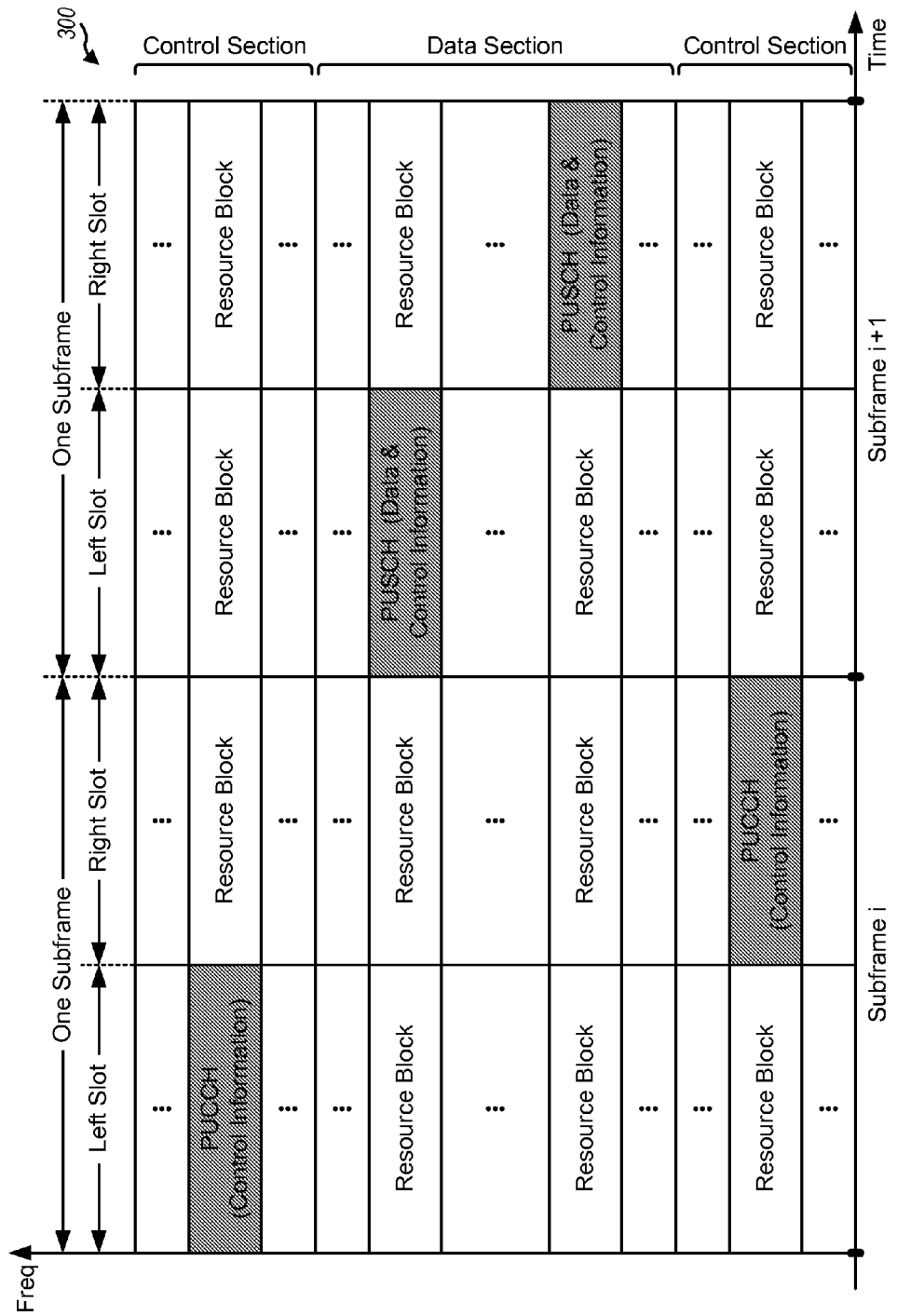
FIG. 3 is a block diagram conceptually illustrating an exemplary frame structure in uplink communications.

FIG. 3 is a block diagram conceptually illustrating an exemplary FDD and TDD (non-special subframe only) subframe structure 300 in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC (primary synchronization carrier), SSC (secondary synchronization carrier), CRS (common reference signal), PBCH (physical broadcast channel), PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
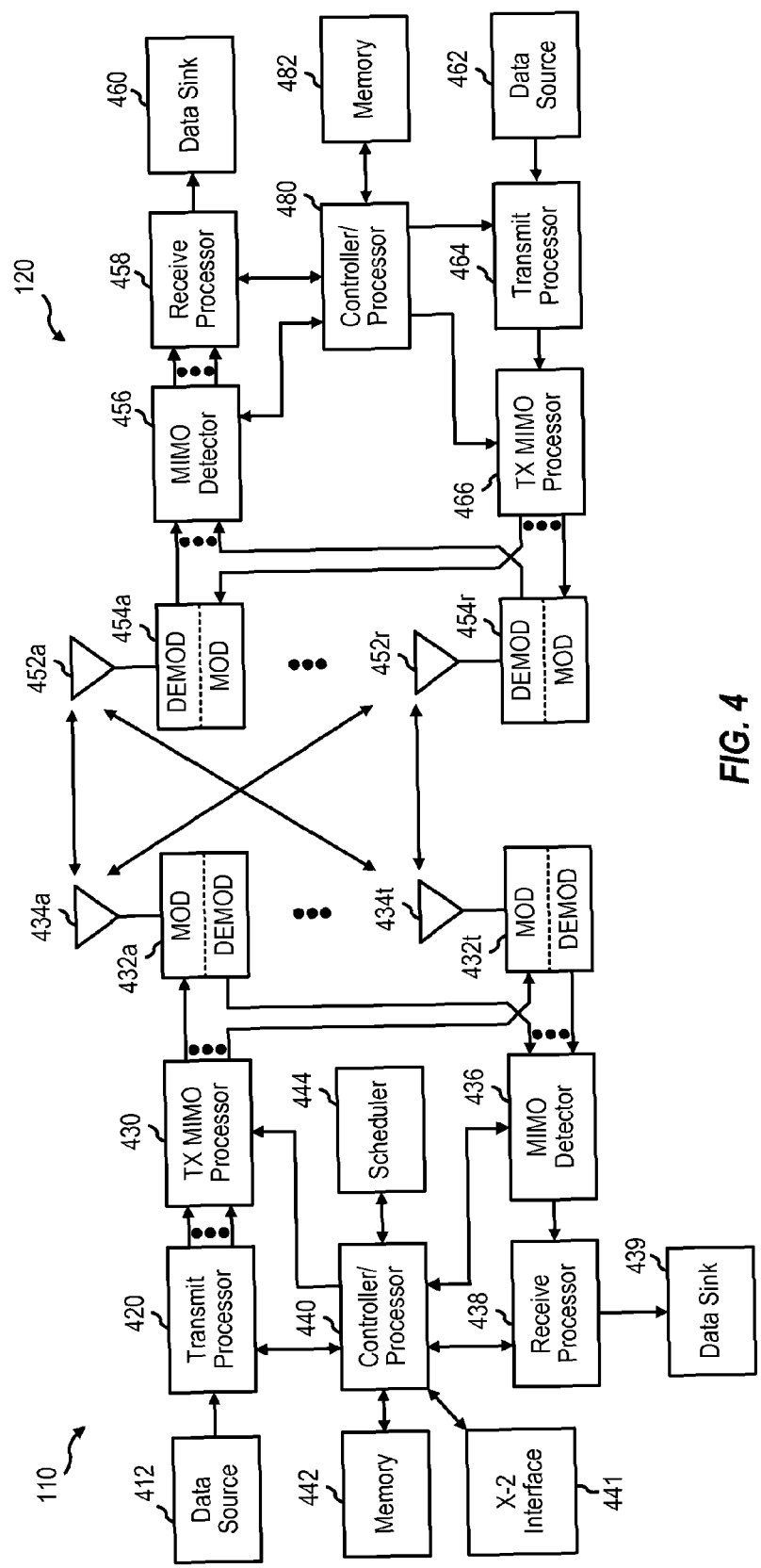
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. For example, the base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440/480 and/or other processors and modules at the base station 110/UE 120 may perform or direct the execution of the functional blocks illustrated in method flow chart FIGS. 6-9 and/or other processes for the techniques described herein. The memories 442 and 482 may store data and program codes for the base station 110 and the UE 120, respectively. A scheduler 444 may schedule UEs for data transmission on the downlink and/or uplink.

Heterogeneous Network

Wireless networks may have eNodeBs of different power classes. For example, three power classes may be defined, in decreasing power class, as macro eNodeBs, pico eNodeBs, and femto eNodeBs. Networks featuring such different power class eNodeBs may be referred to as heterogeneous networks. When macro eNodeBs, pico eNodeBs, and femto eNodeBs are in a co-channel deployment, the power spectral density (PSD) of the macro eNodeB (aggressor eNodeB) may be larger than the PSD of the pico eNodeB and the femto eNodeB (victim eNodeBs) creating large amounts of interference with the pico eNodeB and the femto eNodeB. Protected subframes may be used to reduce or minimize interference with the pico eNodeBs and femto eNodeBs. That is, a protected subframe may be scheduled for the victim eNodeB to correspond with a prohibited subframe on the aggressor eNodeB.

Referring back to FIG. 1, the heterogeneous wireless network 100 uses the diverse set of eNodeBs 110 (i.e., macro eNodeBs, pico eNodeBs, femto eNodeBs, and relays) to improve the spectral efficiency of the system per unit area. The macro eNodeBs 110a-c are usually carefully planned and placed by the provider of the wireless network 100. The macro eNodeBs 110a-c generally transmit at high power levels (e.g., 5 W-40 W). The pico eNodeB 110x and the relay 110r, which generally transmit at substantially lower power levels (e.g., 100 mW-2 W), may be deployed in a relatively unplanned manner to eliminate coverage holes in the coverage area provided by the macro eNodeBs 110a-c and improve capacity in the hot spots. The femto eNodeBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNodeB that may communicate with the other eNodeBs 110 of the wireless network 100 to perform resource coordination and coordination of interference management. The femto eNodeBs 110y-z typically also transmit at substantially lower power levels (e.g., 100 mW-2 W) than the macro eNodeBs 110a-c.

In operation of a heterogeneous network, such as the wireless network 100, each UE is usually served by the eNodeB 110 with the better signal quality, while the unwanted signals received from the other eNodeBs 110 are treated as interference. While such operational principals can lead to significantly sub-optimal performance, gains in network performance are realized in the wireless network 100 by using intelligent resource coordination among the eNodeBs 110, better server selection strategies, and more advanced techniques for efficient interference management.

A pico eNodeB, such as the pico eNodeB 110x, is characterized by a substantially lower transmit power when compared with a macro eNodeB, such as the macro eNodeBs 110a-c. A pico eNodeB will also usually be placed around a network, such as the wireless network 100, in an ad hoc manner. Because of this unplanned deployment, wireless networks with pico eNodeB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNodeBs 110a-c and the pico eNodeB 110x implies that, in a mixed deployment, the downlink coverage area of the pico eNodeB 110x will be much smaller than that of the macro eNodeBs 110a-c.

In the uplink case, however, the signal strength of the uplink signal is governed by the UE, and, thus, will be similar when received by any type of the eNodeBs 110. With the uplink coverage areas for the eNodeBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNodeB more difficult in the wireless network 100 than in a macro eNodeB-only homogeneous network, where the downlink and uplink handover boundaries are more closely matched.

CSI Signalling

Currently, LTE-Rel-10 uses a channel state information reference signal (CSI-RS) to support low reference signal overhead. The CSI-RS has a certain periodicity and subframe offset that is signaled to the UE. The UE processes the CSI-RS for a channel estimate and feeds back information related to the channel estimate.

When CSI-RS transmissions collide with signals, such as PSS/SSS/PBCH/SIB1 or configured paging subframes, the CSI-RS is dropped. In other words, if the scheduled CSI-RS transmission would otherwise overlap with these signals, for example configured paging subframes that may contain paging transmissions, then the CSI-RS transmission is dropped. Overlap means that at least one RE (resource element) of the CSI-RS transmission and any of the specified signals overlap.

The paging configuration of a cell indicates the set of all subframes that may contain paging transmissions. Each UE may be further configured to receive its paging on a subset of the configured paging subframes.

Another characteristic of an LTE network is muting. Muting refers to the blanking of a few resource elements by a first cell. For example, the CSI-RS locations of a second cell may be blanked in a first cell to improve the penetration of the CSI-RS of the second cell. With muting, the CSI-RS of the second cell does not see the interference from the first cell. The muting is dropped (i.e., muting is not performed) when muted subframes collide with configured paging subframes of the first cell.

Figure 5:
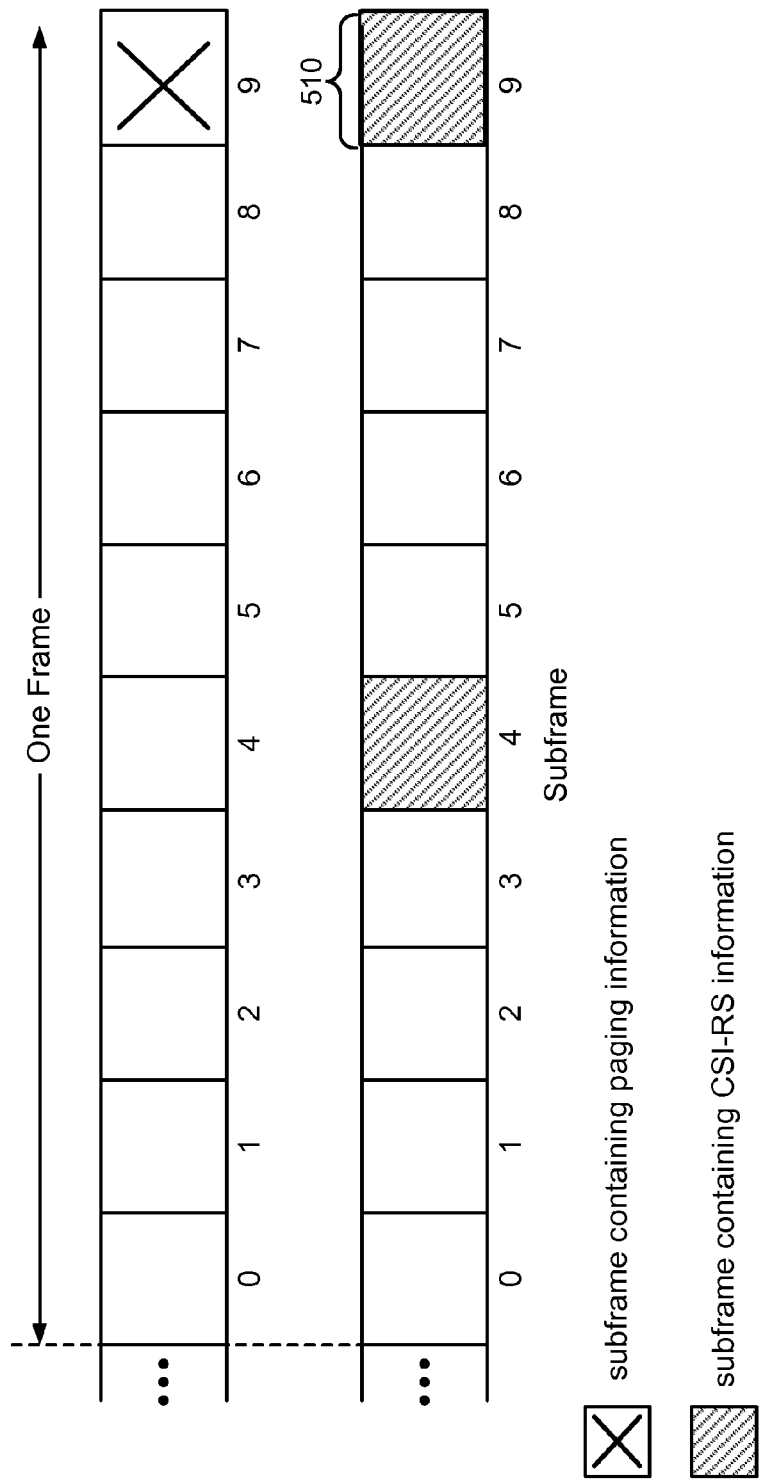
FIG. 5 discloses an overlap in a paging subframe transmission with a CSI-RS transmission.

Referring to FIG. 5, example paging and CSI-RS radio frames are shown. In this example, subframe 9 is designated by the eNodeB as a paging subframe and may contain paging information. In this example, the CSI-RS is configured with a periodicity of 5 ms and offset of 4 subframes resulting in subframes 4 and 9 being configured as CSI-RS subframes. Because both the paging radio frame and CSI-RS radio frame contain information in their respective subframe 9, the subframes 510 overlap and the CSI-RS transmission is dropped. In another example, if the CSI-RS radio frame only contains information in subframe 7, then the CSI-RS subframes would not overlap with the paging transmission and the CSI-RS transmissions would not be dropped. Similarly, if muting is scheduled for a particular subframe allocated for paging (e.g., subframe 9), then the muting would not occur.

The allocation of paging subframes is variable and is controlled by a parameter (nB parameter) included in system information block-2 (SIB-2). Thus, if the UE is aware of this parameter, the UE would know when the CSI-RS will be dropped. That is, the UE is capable of determining the cell-specific paging subframe occasions based on the nB parameter.

Generally, the paging subframes are not transmitted in every subframe. Rather, paging subframes are transmitted based on paging configurations defined by the nB parameter. The nB parameter is defined by 3GPP TS 36.331 as the following values.

nB: ENUMERATED {fourT, twoT, oneT, halfT, quarterT, oneEighthT, oneSixteenthT, oneThirtySecondT}.

Based on equations defined in 3GPP TS 36.304, the cell-specific paging subframe (SF) set is indicated below where every nth frame indicates a frame for which system frame number (SFN) mod n=0.

nB=fourT: SF 0, 4, 5, 9 in every frame
nB=twoT: SF 4, 9 in every frame
nB=oneT: SF 9 in every frame
nB=halfT: SF 9 in every other frame
nB=quarterT: SF 9 in every 4th frame
nB=oneEighthT SF 9 in every 8th frame
nB=oneSixteenthT SF 9 in every 16th frame
nB=oneThirtySecondT SF 9 in every 32nd frame For example, according to the above information, when the paging configuration is set as nB=fourT, then paging information is transmitted in subframes 0, 4, 5 and 9 for every radio frame. Alternately, in another example, when the paging configuration is set as nB=twoT, then according to the above information, the paging information is transmitted in subframes 4 and 9 for every radio frame, as shown in FIG. 5.

Currently, a UE is aware of the nB parameter value of its serving cell, but the UE is not aware of the nB parameter value of neighboring cells. In an aspect of the present disclosure, systems and methods provide support within a wireless communication environment to facilitate UE determination of whether a CSI-RS transmission will be dropped by providing neighbor cell paging configurations to the UE. For example, the UE can be signaled the nB parameter of neighboring cells, or other such similar information. Similarly, the UE can determine whether muting will occur in a neighbor cell, based on the signaling. In a coordinated multipoint (CoMP) scenario, the term "neighbor" cell is intended to cover the second serving cell, for example in a joint transmission mode.

The UE searches for the CSI-RS transmissions based on the paging subframe configuration to understand whether a CSI-RS is present (or dropped) on a specific subframe. In particular, the UE should be aware of the nB parameter or other equivalent information indicating the cell-specific paging subframe allocation. This information allows the UE to determine whether a CSI-RS transmission has been dropped. The nB parameter information (or paging information) corresponding to the serving cell is signalled to the UE by its serving cell. Accordingly, the UE can determine where to search for CSI-RS transmissions based on which CSI-RS transmissions have been dropped.

Whenever a UE measures a CSI-RS for more than one cell, for example in a CoMP (coordinated multi point) scenario or a heterogeneous network scenario, the UE measures and reports the CSI-RS for neighboring/aggressor cells in addition to its serving cell. In the CoMP scenario, the heterogeneous network scenario or any case when a CSI-RS is measured for more than one cell, the nB parameter information is currently not available for non-serving cells. According to the present disclosure, the nB parameter information corresponding to a neighbor cell is signalled to the UE by its serving cell or the neighbor cell. Thus, the neighbor cell paging configuration (e.g., nB parameter) is signaled to the UE in addition to the CSI-RS configuration parameters of the neighboring cells which may include information such as periodicity, subframe offset, intra subframe location, number of CSI-RS antenna ports, etc. This information allows the UE to calculate when a CSI-RS will occur in the neighbor cells. In another configuration, the paging configuration is not signaled, but rather the UE is informed of which subframes have non-serving cell CSI-RS, and in which subframes the CSI-RS is dropped. Similar considerations apply for muting in neighbor cells.

In one configuration a UE may receive a paging configuration corresponding to at least two cells. In this configuration, the two cells are a serving cell and neighbor cell. In a coordinated multipoint configuration, in which the UE is served by multiple cells, the term neighbor cell may refer to one of the serving cells.

In one configuration, the signaling of the non-serving cell paging configuration information (e.g., nB parameter) may be added to the same message in which the neighbor cell CSI-RS parameters are conveyed. The paging configuration (or the nB parameter information) of the neighboring cells is transmitted to the UE to allow the UE to determine which CSI-RS transmissions have been dropped. Alternatively, the UE is informed of which subframes have neighbor CSI-RS, and which subframes the CSI-RS is dropped. When determining whether muting will occur, the signalling can be performed in a similar manner.

Additionally, in another configuration, the paging configuration information (e.g., nB parameter) is added in backhaul messages because neighboring/aggressor eNodeBs are currently unaware of each other's paging configuration. As a result of including the paging configuration in backhaul messages, each eNodeB may convey the neighboring/aggressor cell paging configuration information to the UEs served by it when signalling CSI-RS configuration information of its neighbors. Similarly, the backhaul information is useful in a heterogeneous network scenario. The backhaul information may be communicated via the S1 interface, X2 interface or any interface conveying OAM (operation, administration and maintenance) messages.

Figure 6:
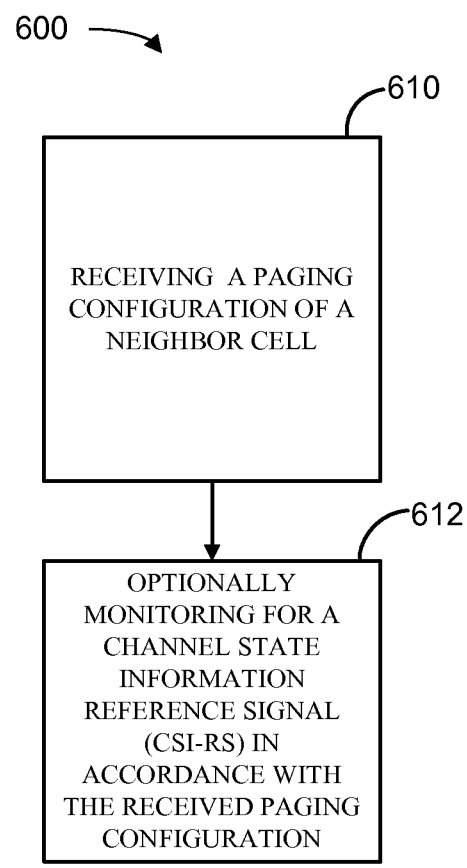
FIG. 6 is a block diagram illustrating a method for signaling paging configurations and CSI-RS configurations.

FIG. 6 is an example block diagram illustrating a method 600 of paging parameter signaling. In the example, information is received indicating neighbor cell paging configurations. For example, a message is received that includes a paging configuration of a neighbor cell at block 610. Next, in block 612, the received information is used to optionally monitor for a CSI-RS and/or determine muted resource elements, CSI-RS resource elements, and/or data resource elements. In some configurations, the received information can further be used to determine or report CSI feedback or a measurement report. This determination or reporting may be based on a CSI-RS of a serving cell and/or a second neighbor cell when resources corresponding to the CSI-RS of the serving cell or the second neighbor cell are determined, based on the received paging configuration, to be muted by a first neighbor cell.

Figure 7:
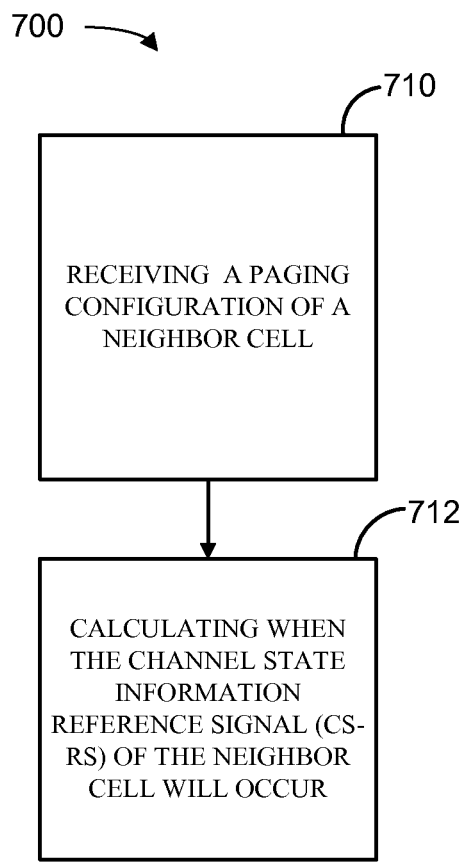
FIG. 7 is a block diagram illustrating a method for receiving paging configurations and calculating when a CSI-RS of a neighbor cell will occur.

Another exemplary block diagram, shown in FIG. 7, illustrates a method of paging parameter signaling. In the example method 700, information is received and used to calculate when non-serving Channel State Information Reference Signal (CSI-RS) transmissions will occur. For example, a message is received that includes a paging configuration of a neighbor cell at block 710. Next, in block 712, the received information is used to calculate when the CSI-RS of the neighbor cell will occur. For example, the information may be used to determine when to monitor the CSI-RS of a neighbor cell; to identify data resource elements, such as in coordinated multipoint (CoMP) schemes where data is rate matched around the CSI-RS and muted resource elements of the neighboring cell; and to determine whether interference is caused by neighbor cell transmissions.

Figure 8:
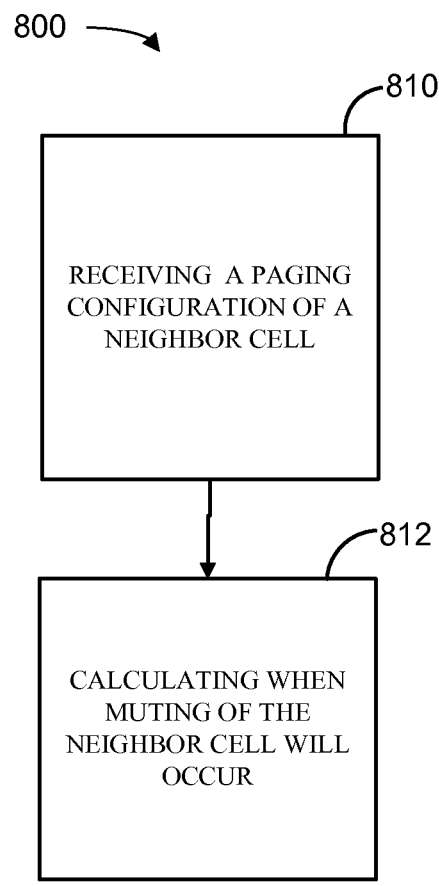
FIG. 8 is a block diagram illustrating components for receiving paging configurations and calculating when muting of a neighbor cell will occur.
Figure 9:
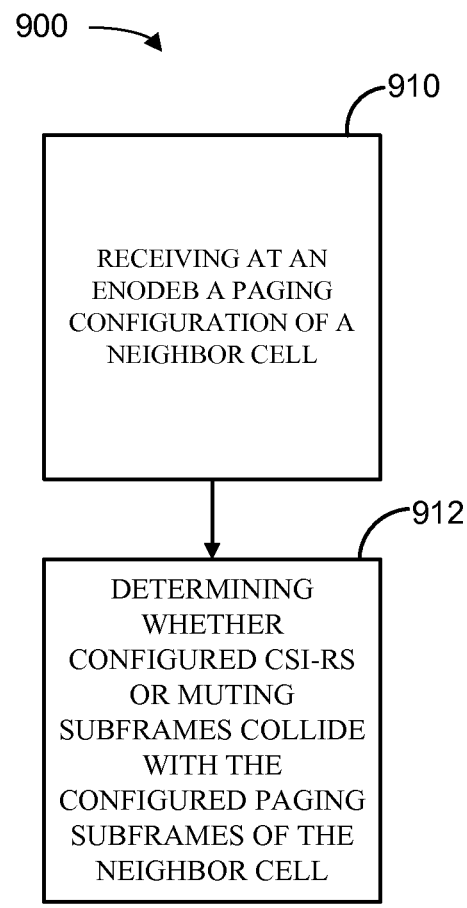
FIG. 9 is a block diagram illustrating a method for receiving paging configurations and determining collisions.

FIG. 8 is an example block diagram illustrating a method of paging parameter signaling. In the example method 800, information is received indicating when non-serving Channel State Information Reference Signal (CSI-RS) transmissions are dropped or muted because of an overlapping non-serving paging occasion. For example, a message is received that includes a paging configuration of a non-serving cell at block 810. Next, in block 812, the received information is used to calculate when muting of the neighbor cell will occur. For example, the information may be used to determine when to monitor the CSI-RS of a neighbor cell; to identify data resource elements, such as in coordinated multipoint (CoMP)

schemes where data is rate matched around the CSI-RS and muted resource elements of the neighboring cell; and to determine whether interference is caused by neighbor cell transmissions FIG. 9 is an example block diagram illustrating a method of paging parameter signaling. In the example method 900, information is received indicating paging configurations. For example, a message is received that includes a paging configuration of a neighbor cell at block 910. Next, in block 912, the received information is used to determine whether configured CSI-RS or muting subframes collide with the configured paging subframes of the neighbor cell.

Figure 10:
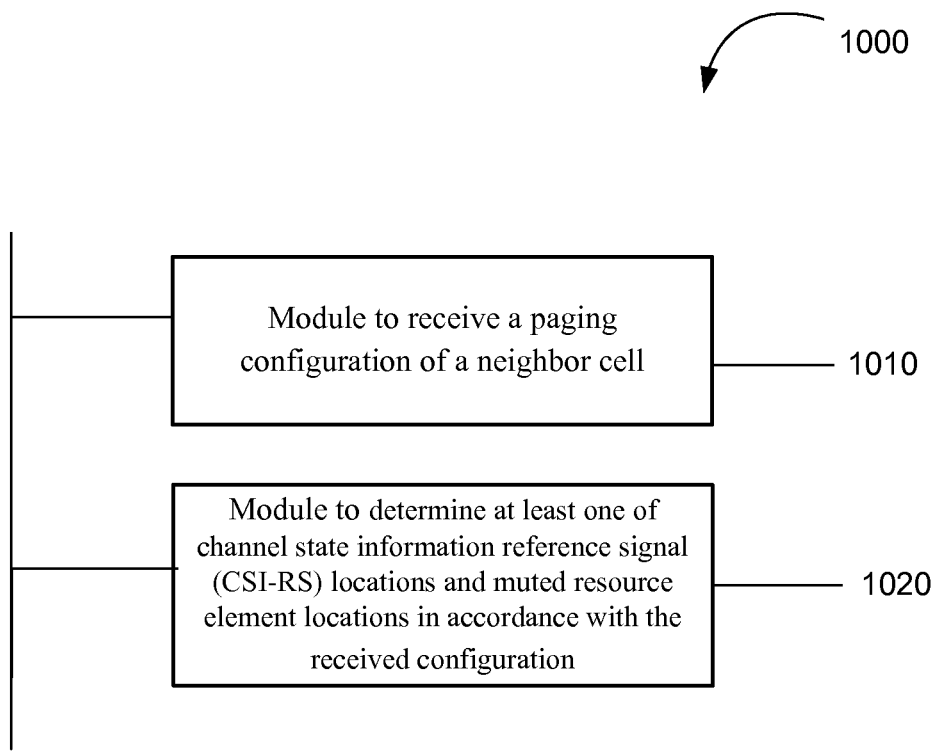
FIG. 10 is a block diagram illustrating components for receiving a paging configuration.

FIG. 10 illustrates a design for an apparatus 1000 for receiving paging configurations of neighboring cells. Block 1010 includes a module to receive a paging configuration of a neighbor cell. Block 1020 includes a module to determine at least one of channel state information reference signal (CSI-RS) locations and muted resource element locations in accordance with the received configuration. The modules in FIG. 10 may be processors, electronics devices, hardware devices, electronics components, logical circuits, memories, software codes, firmware codes, etc., or any combination thereof.

Figure 11:
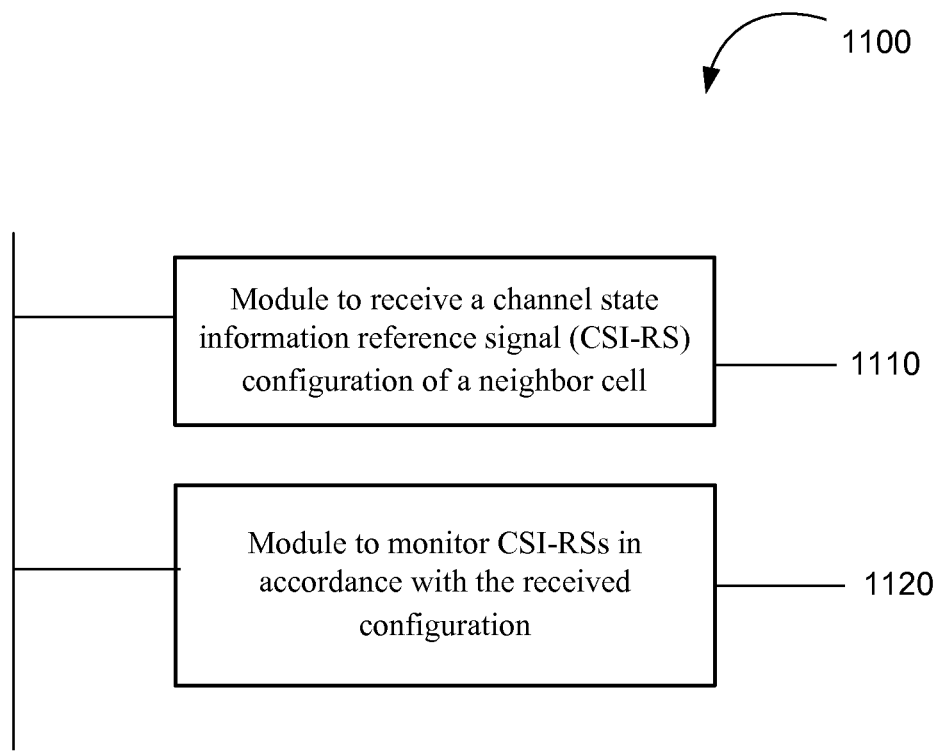
FIG. 11 is a block diagram illustrating components for receiving a CSI-RS configuration.

FIG. 11 illustrates a design for an apparatus 1100 for receiving CSI-RS configurations of neighboring cells. Block 1010 includes a module to receive channel state information reference signal (CSI-RS) configuration of a neighbor cell. Block 1020 includes a module to monitor CSI-RSs in accordance with the received configuration. The modules in FIG. 11 may be processors, electronics devices, hardware devices, electronics components, logical circuits, memories, software codes, firmware codes, etc., or any combination thereof. When receiving a CSI-RS configuration of a neighboring cell, the configuration may include information that enables a UE to identify subframes containing CSI-RSs or muted subframes. For example, the CSI-RS configuration may indicate subframe offset and periodicity.

In one configuration, the UE 120 is configured for wireless communication includes means for receiving and a means for determining. In one aspect, the receiving means may be the processor(s), the antenna 452a, the controller/processor 480, the memory 482, demodulator 454a, and/or the receive processor 458, configured to perform the functions recited by the aforementioned means. The determining means may be the controller/processor 480 and/or the memory 482 In another aspect, the aforementioned means may be any module or any apparatus configured to perform the functions recited by the aforementioned means.

In one configuration, the eNodeB 110 is configured for wireless communication includes means for receiving and a determining means. In one aspect, the receiving means may be the processor(s), the antenna 434t, the controller/processor 440, the memory 442, demodulator 432t, X-2 interface 441, and/or the receive processor 438, configured to perform the functions recited by the aforementioned means. The determining means may be the controller/processor 440 and/or the memory 442. In another aspect, the aforementioned means may be any module or any apparatus configured to perform the functions recited by the aforementioned means.

In another configuration, the UE 120 is configured for wireless communication includes means for receiving and a means for monitoring. In one aspect, the aforementioned means may be the processor(s), the antenna 452a, the controller/processor 480, the memory 482, demodulator 454a, and/or the receive processor 458, configured to perform the functions recited by the aforementioned means. In another aspect, the aforementioned means may be any module or any apparatus configured to perform the functions recited by the aforementioned means.

In another configuration, the eNodeB 110 is configured for wireless communication includes means for receiving and a monitoring means. In one aspect, the aforementioned means may be the processor(s), the antenna 434t, the receive controller/processor 440, the memory 442, demodulator 432t, X-2 interface 441, and/or the receive processor 438, configured to perform the functions recited by the aforementioned means. In another aspect, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, at a user equipment (UE), a first parameter that defines a channel state information reference signal (CSI-RS) configuration of a neighbor cell;
   receiving, at the UE, a second parameter that defines a paging configuration of a the neighbor cell, the paging configuration indicating at least one subframe of the neighbor cell that includes a paging message, and the first parameter and second parameter being received when the UE uses CSI-RSs of both the neighbor cell and a serving cell to perform CSI-RS measurements;
   determining, at the UE, from the first parameter, the CSI-RS configuration of the neighbor cell;
   determining, at the UE, from the second parameter, the paging configuration of the neighbor cell;
   determining, at the UE, from at least the paging configuration and the CSI-RS configuration of the neighbor cell, a location of a dropped CSI-RS resource of the neighbor cell, or whether muting of at least one resource element of the neighbor cell is dropped, or a combination thereof;
   measuring the CSI-RSs of at least the serving cell, another neighbor cell, or a combination thereof based at least in part on the determined location of the dropped CSI-RS resource or whether the muting of the at least one resource element is dropped; and
   reporting the measured CSI-RSs of at least the serving cell, another neighbor cell, or a combination thereof.

2. The method of claim 1, in which the UE receives the first parameter and the second parameter of a plurality of cells.

3. The method of claim 2, in which the plurality of cells comprise the serving cell and the neighbor cell.

4. The method of claim 1, in which the first parameter and the second parameter are received from a serving base station.

5. The method of claim 4, in which the serving base station receives the first parameter and the second parameter via an S1 interface, an X2 interface, or an operations administration and maintenance (OAM) message.

6. The method of claim 1, in which the second parameter is included in a message containing the first parameter or a muting configuration of neighboring cells.

7. An apparatus for wireless communication, comprising:
   means for receiving, at a user equipment (UE), a first parameter that defines a channel state information reference signal (CSI-RS) configuration of a neighbor cell;
   means for receiving, at the UE, a second parameter that defines a paging configuration of the neighbor cell, the paging configuration indicating at least one subframe of the neighbor cell that includes a paging message, and the first parameter and second parameter being received when the UE uses CSI-RSs of both the neighbor cell and a serving cell to perform CSI-RS measurements;
   means for determining, at the UE, from the first parameter, the CSI-RS configuration of the neighbor cell;
   means for determining, at the UE, from the second parameter, the paging configuration of the neighbor cell;
   means for determining, at the UE, from at least the paging configuration and the CSI-RS configuration of the neighbor cell, a location of a dropped CSI-RS resource of the neighbor cell, or whether muting of at least one resource element of the neighbor cell is dropped, or a combination thereof;
   means for measuring the CSI-RSs of at least the serving cell, another neighbor cell, or a combination thereof based at least in part on the determined location of the dropped CSI-RS resource or whether the muting of the at least one resource element is dropped; and
   means for reporting the measured CSI-RSs of at least the serving cell, another neighbor cell, or a combination thereof.

8. A user equipment (UE) for wireless communication, comprising:
   a memory; and
   at least one processor coupled to the memory, the at least one processor being configured:
   to receive a first parameter that defines a channel state information reference signal (CSI-RS) configuration of a neighbor cell;
   to receive a second parameter that defines a paging configuration of the neighbor cell, the paging configuration indicating at least one subframe of the neighbor cell that includes a paging message, and the first parameter and second parameter being received when the UE uses CSI-RSs of both the neighbor cell and a serving cell to perform CSI-RS measurements;
   to determine from the first parameter, the CSI-RS configuration of the neighbor cell;
   to determine from the second parameter, the paging configuration of the neighbor cell;
   to determine from at least the paging configuration and the CSI-RS configuration of the neighbor cell, a location of a dropped CSI-RS resource of the neighbor cell, or whether muting of at least one resource element of the neighbor cell is dropped, or a combination thereof;
   to measure the CSI-RSs of at least the serving cell, another neighbor cell, or a combination thereof based at least in part on the determined location of the dropped CSI-RS resource or whether the muting of the at least one resource element is dropped; and to report the measured CSI-RSs of at least the serving cell, another neighbor cell, or a combination thereof.

9. The UE of claim 8, in which the UE receives the first parameter and the second parameter of a plurality of cells.

10. The UE of claim 9, in which the plurality of cells comprise the serving cell and the neighbor cell.

11. The UE of claim 8 in which the first parameter and the second parameter are received from a serving base station.

12. The UE of claim 11, in which the serving base station receives the first parameter and the second parameter via an S1 interface, an X2 interface, or an operations administration and maintenance (OAM) message.

13. The UE of claim 8, in which the parameter is included in a message containing at least one of a CSI-RS configuration and a muting configuration of neighboring cells.

14. A computer program product for wireless communication in a wireless network, comprising:

a non-transitory computer-readable medium having non-transitory program code recorded thereon, the program code being executable by a processor to perform the steps of:

receiving, at a user equipment (UE), a first parameter that defines a channel state information reference signal (CSI-RS) configuration of a neighbor cell;

receiving, at the UE, a second parameter that defines a paging configuration of the neighbor cell, the paging configuration indicating at least one subframe of the neighbor cell that includes a paging message, and the first parameter and second parameter being received when the UE uses CSI-RSs of both the neighbor cell and a serving cell to perform CSI-RS measurements;

determining from the first parameter, the CSI-RS configuration of the neighbor cell;

determining, at the UE, from the second parameter, the paging configuration of the neighbor cell;

determining, at the UE, from at least the paging configuration and the CSI-RS configuration of the neighbor cell, a location of a dropped CSI-RS resource of the neighbor cell, or whether muting of at least one resource element of the neighbor cell is dropped, or a combination thereof;

measuring the CSI-RSs of at least the serving cell, another neighbor cell, or a combination thereof based at least in part on the determined location of the dropped CSI-RS resource or whether the muting of the at least one resource element is dropped; and reporting the measured CSI-RSs of at least the serving cell, another neighbor cell, or a combination thereof.

* * * * *